(12) United States Patent
Mueller et al.

(10) Patent No.: US 11,142,164 B2
(45) Date of Patent: Oct. 12, 2021

(54) VEHICLE INHIBITOR

(71) Applicants: Reinhold Mueller, Bonita, CA (US);
Juan Carlos Vazquez, Lakewood, CO (US)

(72) Inventors: Reinhold Mueller, Bonita, CA (US);
Juan Carlos Vazquez, Lakewood, CO (US)

( * ) Notice: Subject to any disclaimer, the term of this patent is extended or adjusted under 35 U.S.C. 154(b) by 0 days.

(21) Appl. No.: 16/988,561

(22) Filed: Aug. 7, 2020

(65) Prior Publication Data

US 2020/0369239 A1 Nov. 26, 2020

Related U.S. Application Data

(63) Continuation-in-part of application No. 16/158,291, filed on Oct. 11, 2018, now Pat. No. 10,766,457.

(60) Provisional application No. 62/571,048, filed on Oct. 11, 2017.

(51) Int. Cl.
*B60R 25/20* (2013.01)
*B60R 25/30* (2013.01)
*B60R 25/40* (2013.01)
*B60K 35/00* (2006.01)
*B60R 25/04* (2013.01)
*B60R 25/045* (2013.01)
*B60R 25/24* (2013.01)

(52) U.S. Cl.
CPC .......... *B60R 25/045* (2013.01); *B60K 35/00* (2013.01); *B60R 25/2009* (2013.01); *B60R 25/24* (2013.01); *B60R 25/30* (2013.01); *B60R 25/403* (2013.01); *B60K 2370/152* (2019.05); *B60K 2370/157* (2019.05); *B60K 2370/62* (2019.05); *B60R 2025/0405* (2013.01); *B60R 2325/103* (2013.01)

(58) Field of Classification Search
None
See application file for complete search history.

(56) References Cited

U.S. PATENT DOCUMENTS 7,266,507 B2 * 9/2007 Simon ................ B60R 25/2018
705/35
2016/0012327 A1 * 1/2016 Wang ............... G06K 19/07739
235/492

* cited by examiner

*Primary Examiner* — Daniell L Negron
(74) *Attorney, Agent, or Firm* — Enrique A. Monteagudo, Esq.

(57) ABSTRACT

Aspects of the present disclosure generally pertain to a vehicle inhibitor with an enhanced user interface and a system and method for overriding a vehicle inhibitor. This disclosure may be useful for providing an emergency override function for vehicle loan repayment enforcement systems that have wireless user interface modules, and that have become lost or inoperable when needed to generate an emergency override signal. Further, the present disclosure addresses this problem while mitigating additional system cost and additional components. This disclosure includes a method of providing an emergency override function for vehicle loan repayment enforcement systems that have wireless user interface modules, and that have become lost or inoperable when needed to generate an emergency override signal. Further this disclosure includes a method of providing a disablement override function for vehicle loan repayment enforcement systems, wired or wireless, that allows vehicle operation past the grace period in those locations where complete disablement may be limited.

19 Claims, 6 Drawing Sheets

VEHICLE INHIBITOR

CROSS-REFERENCE TO RELATED APPLICATIONS

This application is a Continuation-In-Part of currently pending U.S. patent application Ser. No. 16/158,291, filed Oct. 11, 2018 and entitled "Vehicle Inhibitor With Override System And Method"; which claims priority to U.S. provisional patent application 62/571,048, filed Oct. 11, 2017 and entitled "Vehicle Inhibitor With Override System And Method", the contents of both of which are incorporated herein by reference in their entirety.

BACKGROUND OF THE INVENTION

Technical Field

The present disclosure generally pertains to vehicle disabling devices, and is more particularly directed towards vehicle disabling devices having an enhanced user interface.

Related Art

Vehicle financing companies and individuals are installing electronic disabling systems in vehicles sold to buyers with poor credit, to encourage timely loan payments. The disabling system automatically interrupts the vehicle starter/ignition to prevent the vehicle from being operated whenever the buyer's loan payment is in default, i.e., payment has not been made within the allotted payment period, including the grace period.

Disabling systems typically consists of two parts: an electrical switch module and a user interface. The electrical switch module, usually installed out of sight, interrupts the flow of power to the vehicle starter/ignition upon receiving a command to do so from the software in the microcontroller (disable command). The user interface is a module visible to the driver, which may be installed inside the vehicle. This module: (a) acts to alert the driver to the impending disable day should the next loan payment not be made, or (b) is used to transmit a reset signal (provided by the financing entity) to the electrical switch module to allow unhindered vehicle operation for another pay period, or (c) is used to send a special emergency vehicle enable signal to remove the vehicle disable command for a preset amount of time to avoid stranding the driver when in the overdue state. Vehicle Inhibitor systems do not provide any indication to the driver as to when starter delay period begins and ends prior to inhibitor override taking effect.

For example, U.S. Pat. No. 6,195,648 to Simon, et al. on Feb. 27, 2001, shows a loan repay enforcement system. The disclosed system relates to a system to encourage on time repayment of loans, and includes electronic apparatus coupled to a critical system of certain equipment; for example, the starter/ignition system of an automobile. Apparatus includes mechanism whereby a user-operator is able to enter a vehicle enable code. Entry of a correct code serves as indication that a payment has been made and enables further use of the equipment. On failure to timely make payments, a user is prevented from using the equipment as the apparatus is arranged to disable the equipment by way of the critical system to which it is coupled. Both a user-operator interface and critical system interruption circuit are coupled to a logic processor which is easily mounted onto equipment subject to the program.

A problem may occur however, if the user interface becomes damaged, removed, or otherwise unavailable when needed. In this case, the emergency vehicle enable function cannot be accessed. This could lead to dangerous and perhaps life-threatening situations. In some cases, to solve this problem, hidden switches or secondary wireless modules may be added, increasing equipment and installation costs. In some jurisdictions, a driver may be entitled to a predefined number of days (e.g., 45) after default before his vehicle may be disabled. Another problem can occur, where the user/driver is unaware of a status of a vehicle lockout device or a pending change to its status.

The present disclosure is directed toward overcoming known problems and problems discovered by the inventor. Further, the present disclosure addresses this problem while mitigating additional components and additional system cost.

SUMMARY OF THE INVENTION

A vehicle inhibitor for a vehicle is disclosed herein, the vehicle including a vehicle battery. The vehicle inhibitor includes a power supply configured to power the vehicle inhibitor, a controller module configured to inhibit normal operation of the vehicle by a driver upon the occurrence of a predetermined event, and further configured to resume the inhibited normal operation of the vehicle by the driver upon receiving an enable-command, and a user interface communicably coupled to the controller module, with the user interface including a user-input and a user-output. The user-input is configured receive an enable communication from the driver and to transmit the enable-command to the controller module in response to the enable communication received from the driver. The user-output is configured to visually or aurally indicate a status of the vehicle inhibitor to the driver.

According to one embodiment, a vehicle inhibitor for a vehicle is disclosed herein, the vehicle including a vehicle battery. The vehicle inhibitor includes a power supply, a controller module, a vehicle signaling interface, an override module, and a user interface communicably coupled to the controller module, the user interface including a user-input and a user-output. The power supply is configured to power the vehicle inhibitor the power supply includes a vehicle power interface configured to electrically couple to the vehicle battery, and to power the vehicle inhibitor from the vehicle battery. The controller module is configured to inhibit normal operation of the vehicle by a driver upon the occurrence of a predetermined event, and further configured to resume the inhibited normal operation of the vehicle by the driver upon receiving at least one of an enable-command or an override-command. The vehicle signaling interface is configured to communicably couple to the vehicle and to receive an override communication sent by the driver to the vehicle signaling interface via the vehicle. The override module is communicably coupled to the vehicle signaling interface and the controller module, the override module configured to issue an override-command in response to the override communication received by the driver to the vehicle signaling interface. The user-input is configured to receive an enable communication from the driver and to transmit the enable-command to the controller module in response to the enable communication received from the driver. The user-output is configured to visually or aurally indicate a status of the vehicle inhibitor to the driver.

According to another embodiment, a vehicle inhibitor for a vehicle is disclosed herein, the vehicle including a vehicle battery. The vehicle inhibitor includes a power supply, a controller module, a vehicle signaling interface, an override module, and a user interface communicably coupled to the controller module. The power supply is configured to power the vehicle inhibitor the power supply includes a vehicle power interface configured to electrically couple to the vehicle battery, and to power the vehicle inhibitor from the vehicle battery. The controller module is configured to inhibit a normal operation of the vehicle upon the occurrence of a predetermined event, and further configured to resume the inhibited normal operation of the vehicle upon receiving at least one of an enable-command or an override-command. The vehicle signaling interface is configured to communicably couple to the vehicle and to receive an override communication sent by a driver to the vehicle signaling interface via the vehicle. The override module is communicably coupled to the vehicle signaling interface and the controller module, and is configured to issue an override-command in response to the override communication received by the driver to the vehicle signaling interface. The user interface includes a means for aurally or visually communicating a status of the vehicle inhibitor to the driver, the status having at least a first and a second portion, the first portion of the status of the vehicle inhibitor being whether or not the normal operation of the vehicle is inhibited, and the second portion of the status of the vehicle inhibitor being a duration of the resumption of the inhibited normal operation of the vehicle where the override-command has been received by the override module.

DETAILED DESCRIPTION

Figure 1:
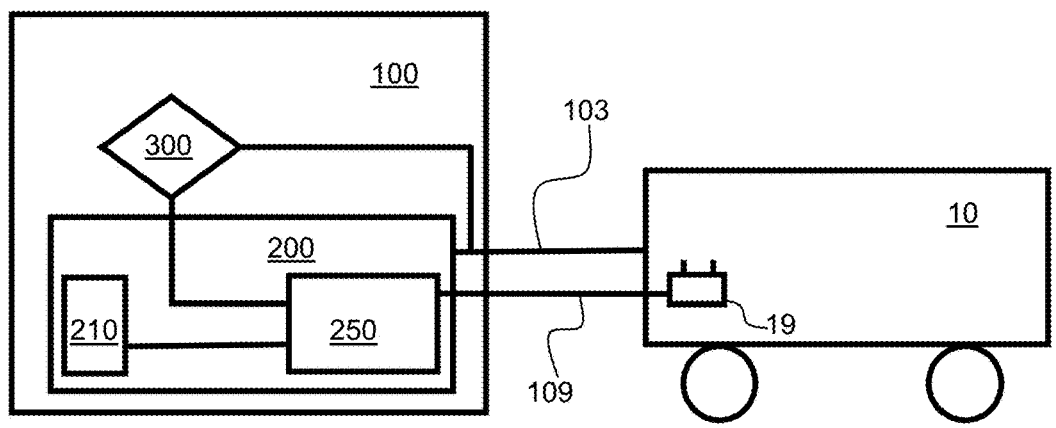
FIG. 1 is a schematic diagram of a system for inhibiting operation of a vehicle, according to an exemplary embodiment of the present disclosure.

Aspects of the present disclosure generally pertain to a visual and/or audible indication to a user/driver of a state of a vehicle inhibitor such as when the starter delay (inhibited operation) period begins and when it ends prior to the inhibitor operation taking effect. Beneficially, a user knows exactly when inhibited operation will take effect and/or remedial action information, allowing the driver to take preemptory action and/or remedial action. Further, the disclosure may provide positive indication to user when vehicle may be started. This may be particularly valuable as it may eliminate guessing by user as to when the vehicle will become drivable or otherwise fully functional.

Aspects of the present disclosure generally pertain to a system and method for inhibiting operation of a vehicle (or other high price item), and overriding a vehicle inhibitor (or a vehicle inhibitor having a vehicle enable functionality). Generally, the vehicle inhibitor is a system or device that enables and disables equipment of the vehicle in response to a predefined condition (e.g., receipt of loan payments in due time, failure to receive a code, etc.). The vehicle inhibitor may interrupt a critical system of the vehicle (e.g. starter circuit, ignition system, neutral safety circuit, fuel pump, etc.) or other vehicle equipment in response to the predefined condition. The present disclosure is directed toward overcoming known problems and problems discovered by the inventor. Further, the present disclosure addresses this problem while mitigating additional system cost and additional components.

Aspects of the present disclosure more specifically are directed toward a device or a modified vehicle inhibitor configured to utilize vehicle signaling to initiate the override. This disclosure may be useful for providing an emergency override function for vehicle loan repayment enforcement systems that have wired or wireless user interface modules, and that have become lost or inoperable, but when needed can use an existing signaling device (e.g., a user interface of the vehicle) to generate a signal that will be recognized as an emergency override signal.

Further, the present disclosure addresses this problem while mitigating additional system cost and additional components. Thus, this disclosure may be useful for providing an emergency override function to prevent motorist stranding due to failure of loan payment, where an enforcement system is installed in motorist's vehicle.

Various aspects of the novel systems, devices, and methods are described more fully hereinafter with reference to the accompanying drawings. The detailed description set forth below in connection with the appended drawings is intended as a description of various configurations and embodiments, and is not intended to represent the only configurations in which the concepts described herein may be practiced. The detailed description includes specific details for the purpose of providing a thorough understanding of various concepts. In particular, it will be apparent to those skilled in the art that these concepts may be practiced without these specific details. In some instances, well known structures and components are shown in block diagram form in order to avoid obscuring such concepts.

FIG. 1 is a schematic diagram of a system for inhibiting operation of a vehicle, according to an exemplary embodiment of the present disclosure. In particular, a system 100 for inhibiting operation of a vehicle 10 ("system 100") is shown, and may include a vehicle inhibitor 200 and an override module 300. One or more components of the system 100 may be electrically and communicably coupled to the vehicle 10 or components and systems thereof, as schematically represented by a vehicle signaling interface 103 and a vehicle power interface 109 (shown coupled to a vehicle battery 19). For example, the vehicle power interface 109 may be configured to electrically couple to the vehicle battery 19. Also for example, the vehicle signaling interface 103 may be configured to communicably couple to the vehicle 10 and to receive an override communication sent via the vehicle 10 by a user; as discussed further below.

The vehicle inhibitor 200 may be electrically coupled to the vehicle power interface 109 (e.g., powered by the vehicle battery 19). The vehicle inhibitor 200 may include a user interface 210 and a controller module 250 that is communicably coupled to the user interface 210. In general, the vehicle inhibitor 200 is configured to inhibit operation of the vehicle 10 upon the occurrence of a predetermined event (e.g., noncompliance with a term of access to the vehicle, nonpayment, late payment, etc.). In particular, the vehicle inhibitor 200 may disconnect, interrupt, or otherwise inhibit a critical system of certain equipment, for example, the starter system or a portion of the ignition or fuel circuit of the vehicle 10. This may be done electrically, mechanically, communicatively (signaling), or any combination thereof. It is understood that additional safety features and redundancies may be incorporated. For example, the vehicle inhibitor 200 may be required to confirm that the vehicle is parked or otherwise in a nonoperational state. According to one embodiment, the vehicle inhibitor 200 may disconnect, interrupt, or otherwise inhibit a noncritical system or feature of the vehicle, as discussed below.

The controller module 250 may be configured to inhibit operation of the vehicle 10 upon the occurrence of a predetermined event. In particular, the controller module 250 may be configured to interact with the vehicle 10 so as to inhibit operation of the vehicle 10 or a vehicle feature, and is responsive to commands/signaling from the driver via the user interface 210 and/or the override module 300 so as to resume operations upon receiving at least one of an enable communication or the override-command, respectively, as further discussed below. To illustrate a predetermined event, the controller module 250 may render the vehicle 10 inoperable upon a missed vehicle payment.

The user interface 210 is communicably coupled to the controller module 250 and may be configured to issue commands or communications initiated by/with the driver. (e.g., feedback, confirmations, prompts, instructions, etc.). The user interface 210 is configured such that the driver is able to communicate an "enable-command" (the enable communication) that disengages the vehicle inhibitor 200. For example, the user interface 210 may be used by the driver to input a code associated with a payment being made, which results in the "enable-command" to the controller module 250 to render the vehicle 10 operable again, or otherwise return some functionality to the vehicle 10. The user interface 210 may be embodied as a module visible to the driver, which may be installed anywhere inside the vehicle 10.

The override module 300 is also communicably coupled to the controller module 250 and may be configured to issue commands or communications initiated by/with the driver. The override module 300 may be communicably coupled to the vehicle 10 via the vehicle signaling interface 103. The override module 300 is configured such that the driver is able to communicate an "override-command" (the override communication) that disengages the vehicle inhibitor 200, independently of the user interface 210. In particular, the override module 300 may receive communications, or otherwise interpret signaling from the user via the vehicle signaling interface 103. For example, the override module 300 may interpret CAN bus communications and/or voltage changes associated with a vehicle control or a vehicle accessory as the override-command. In this way, the driver may still be able to operate the overdue vehicle 10 when the user interface 210 is unavailable.

Figure 2:
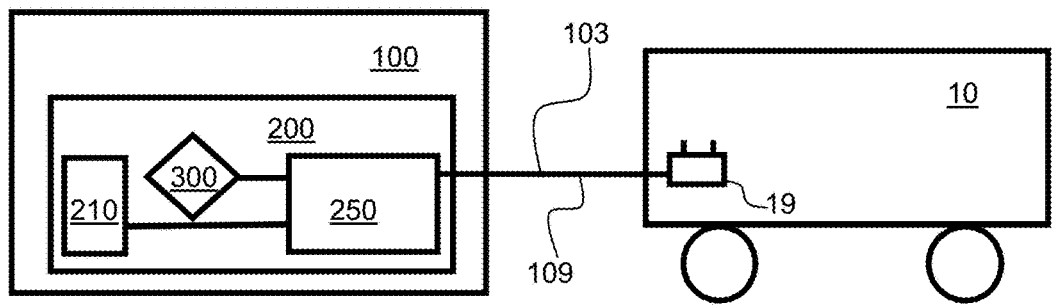
FIG. 2 is a schematic diagram of the system for inhibiting operation of a vehicle, according to another exemplary embodiment of the present disclosure.

FIG. 2 is a schematic diagram of the system for inhibiting operation of a vehicle, according to another exemplary embodiment of the present disclosure. As above, the system 100 may include the vehicle inhibitor 200 and the override module 300. Further, the vehicle inhibitor 200 may include the user interface 210 and the controller module 250.

According to one embodiment, it may be preferred to at least partially integrate the override module 300 with the vehicle inhibitor 200, particularly with the controller module 250. In addition, the override module 300 may use signaling of the vehicle inhibitor 200 that is used for energizing the starter circuit and interpret it, or variations/deviations/repetitions thereof as a communication of an override-command. Beneficially, in this preferred embodiment, the system 100 may have few or no additional costs/components, but may at least partially be configured via software updates or software where available. For example, the vehicle power interface 109 and the vehicle signaling interface 103 may be combined so as to both provide power to the system 100 and receive communications (e.g., the override communication) over a shared media, such as a continuous power coupling (e.g. 12 VDC connection to battery 19).

The vehicle inhibitor 200 may be further configured to receive power from the vehicle 10 via the vehicle power interface 109 and or to communicate (e.g. signaling, sensing, direct communication, etc.) with the vehicle 10 via the vehicle signaling interface 103. According to one embodiment the vehicle inhibitor 200 may share vehicle power and/or communications with the override module 300 via the vehicle power interface 109 and the vehicle signaling interface 103, respectively. Further, the vehicle power interface 109 and the vehicle signaling interface 103 may be combined so as to provide both power and communications (e.g., the override communication) over the same media. In alternate embodiments, the vehicle signaling interface 103 may include a wireless communication link (e.g., Bluetooth, NFC, optical, inductive coupling, etc.).

Figure 3:
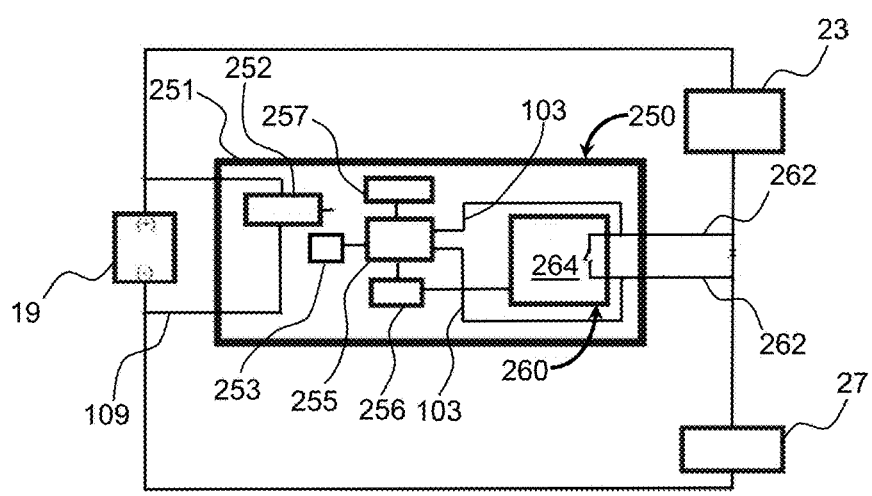
FIG. 3 is a schematic diagram of details of the system for inhibiting operation of a vehicle, according to one embodiment of the present disclosure.

FIG. 3 is a schematic diagram of details of the system for inhibiting operation of a vehicle, according to an embodiment of the present disclosure. Here, the controller module 250 is shown installed into the vehicle 10, being powered by the vehicle battery 19 and configured to interrupt a vehicle accessory (i.e., switchably added in series between a vehicle accessory control 23 and a vehicle accessory 27. Examples of the vehicle accessory 27 may include the vehicle start/ignition circuit (or parts thereof), fuel circuit, neutral safety circuit, while the vehicle accessory control 23 may include each accessories respective user interface, trigger, or control, such as the vehicle start switch.

The controller module 250 may be generally embodied as an electronic device having appropriately configured module, part or units. In particular, controller module 250 may include a chassis 251, a power supply module 252, a memory module 253, a processor module 255, a communication module 257, and an electrical switch module 260. It is understood that one or more sub-modules of the controller module 250 may be combined, integrated, or otherwise share resources. For example, the power supply module 252, the memory module 253, the processor module 255, the communication module 257, and the electrical switch module 260 may include one or more electronically coupled components mounted to a printed circuit board (PCB), which is fixed to and housed by the chassis 251. According to one embodiment, the chassis 251 may be miniaturized, ruggedized, and/or sealed.

It should be understood the various illustrative blocks and modules described throughout can be implemented in various forms. The terms "module," "component" or "circuit" as used herein, individually or collectively refer to hardware, firmware, software and any associated hardware that executes the software, or any combination of these elements for performing the associated functions described herein. Some blocks and modules have been described above generally in terms of their functionality, which may be implemented depending upon design constraints imposed on an overall system. Skilled persons can implement the described functionality in a variety of ways in each particular application. Further, the grouping of functions within a module, block, or unit is for ease of description. Specific features or functionality can be moved from one module or block or distributed across to modules or blocks without departing from the disclosure.

The power supply module 252 may include components and/or circuitry or otherwise be configured to provide power to the controller module 250. For example, the power supply module 252 may include the vehicle power interface 109 coupleable to the vehicle battery 19 and or a local energy storage (not shown). Further, the power supply module 252 may include a voltage regulator or other power conditioning componentry configured to provide DC power of the vehicle battery 19 to the various components of the controller module 250.

The memory module 253 may include any non-transitory computer-readable or processor-readable storage media and any associated circuitry. By way of example but not limitation, such non-transitory computer-readable or processor-readable storage media may include onboard FLASH memory, dynamic memory, RAM, ROM, EEPROM, FLASH memory, optical/magnetic disk storage, or any other medium that may be used to store desired program code in the form of instructions or data structures and that may be accessed by a processor or computer. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product. If implemented in software, the functions may be stored on or transmitted over as one or more instructions or code on a computer-readable medium.

The processor module 255 may include a general purpose processor, an integrated circuit (IC), an analog IC, a mixed signal IC, an application specific integrated circuit (ASIC), a field programmable gate array (FPGA), a digital signal processor (DSP), System on a Chip (SoC), and/or other programmable logic devices, discrete gates or transistor logic, discrete hardware components, or any combination thereof designed to perform the functions described herein. The general-purpose processor may be a microprocessor, but, in the alternative, the processor may be any conventional processor, controller, microcontroller, or state machine. The processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function. Further, the processor module 255 may be a stand-alone device or may be part of a larger device. Also, features and attributes of the specific example modules disclosed above may be combined in different ways to form additional modules or may be embodied as software and/or firmware on or of a processor the processor module 255, all of which fall within the scope of the controller module 250.

Preferably, the processor module 255 may be embodied as or otherwise include a microcontroller. The microcontroller may contain a clock and calendar. The microcontroller may include or utilize with long term battery. According to one embodiment, the microcontroller may be located in the electrical switch module 260 or the user interface 210.

The processor module 255 may be communicably coupled to the memory module 253 and operate using instructions, algorithms, and data stored thereon. For example, the memory module 253 may contain the details of the loan agreement with respect to the payment period, grace days, and other constraints. The processor module 255 may execute code stored on the memory module 253 and that utilized data stored on the memory module 253, for example, that sends the disable command at the end of the grace period unless a payment was received by the financing entity. This information may be transmitted to and received by the memory module 253 by any means via the communication module 257. For example, said means may include direct wire signal, radio frequency signal, infra-red or other light signal, sound signal, or any other wireless signal.

Figure 5:
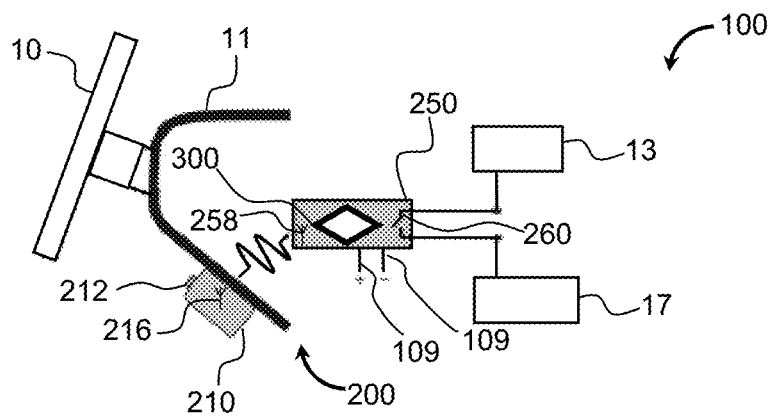
FIG. 5 schematically illustrates a system for inhibiting operation of a vehicle, according to another embodiment of the present disclosure.

The communication module 257 may be configured to communicate with the user interface 210 and/or the override module 300 (FIG. 1), and may communicably couple one or both to the controller module 250, particularly the processor module 255. The communication module 257 may refer to or otherwise include the wireless communication module 258 described below (FIG. 5). As such the communication module 257 may include a radio frequency IC (RFIC) or an ASIC, or other wireless communication device, as discussed above. The RFIC may be an RF receiver (RFR) or an RF transmitter/receiver (RTR) and the ASIC may be a mobile station modem (MSM).

The electrical switch module 260 may include a vehicle interface 262, a switch 264 (e.g., a relay). The electrical switch module 260 may be electronically coupled to the processor module 255 via a relay driver 256, which is configured to operate the relay, thus operating the switch 264 and breaking the vehicle accessory control circuit (i.e., electrically opening the connection between the vehicle accessory control 23 and the vehicle accessory 27, rendering the vehicle accessory 27 in operable. As discussed above, this principle may apply to critical systems such as the vehicle starter/ignition, or components thereof (e.g., the vehicle interface 262 portions of the starter circuit).

According to one embodiment, the processor module 255 may be configured to sense when a circuit of the vehicle (e.g. the vehicle accessory 27 and/or the vehicle starter control circuit 17) is energized, for example, as when turning on the lights, or when starting the vehicle 10. To illustrate, the processor module 255 may include or otherwise be communicably coupled to the vehicle signaling interface 103

(here, the vehicle interface 262). As such, when attempting to energize in the disabled mode, the processor module 255 (e.g., microcontroller) can sense the attempt (e.g., resultant voltage change) even though accessory/engine will not start or will immediately be disabled. Alternately, as above, the vehicle power interface 109 and the vehicle signaling interface 103 may be combined, for example, as the vehicle interface 262 such that both power and signaling (broadly defined) are provided via a single port.

According to one embodiment the processor module 255 and/or the memory module 253 may be programmed with data, such as the length of the loan payment periods, over the air (OTA), via the communication module 257 (e.g., including a RF transceiver, or may be programmed directly via wired connection. With this stored data, during the pay period the processor module 255 may keep the relay contacts closed, allowing vehicle to start or the accessory to operate. If payment is received for the following pay period before the end of the present pay period, the controller module 250 may receive this information via the RF transceiver, and still keep the relay contacts closed. However, if payment is not received before the end of the present pay period, the processor module 255 may cause the relay (switch 264) to open its contacts and disable starting/operation whenever the processor module 255 senses (e.g., via the vehicle interface 262) a voltage on vehicle accessory control 23 (or the vehicle starter control circuit 17) on the next and following days, until payment is received. Notwithstanding, the override module 300 may remain available to the user or driver 5 (FIG. 4) to issue the override-command to start the vehicle 10 in an emergency.

According to one embodiment, the override module 300 may be configured to utilize data associated with operation of the vehicle accessory 27 and/or the starter control circuit 17. In particular, the override module 300 may receive or otherwise interpret an override request independently of user interface 210 using the information from an operation attempt (and the associated data) as a communication attempt. For example, the vehicle interface 262 (or the vehicle signaling interface 103 or another vehicle interface) may be configured to provide sensed voltages, vehicle communications, or other detected signaling to the override module 300 (or indirectly, via the processor module 255). From this, the operation attempt may be determined. According to one embodiment, the vehicle signaling interface 103 may be coupled to a port of the processor module 255 (e.g., GPIO port) and the data may be communicated to the override module 300. Alternately, as above, the override module 300 may be integrated with the processor module 255, for example as hardware, firmware, software, etc. and the information of the override request may be interpreted directly as the override-command.

To illustrate, according to one exemplary embodiment, the operation/start attempt, or a series of attempts may be monitored by the processor module 255 and recorded as a series of highs and lows. This series may be compared to a specific series ("code") previously programmed into the memory module 253, and when a match occurs (e.g., against a predefined approved pattern), the override-command is sent, closing/keeping closed the switch 264 and allowing the vehicle accessory 27 to be operated or the vehicle 10 to be started.

Also to illustrate, "tiered steps" may be utilized. For example, after trying to start the vehicle 10 (via keyswitch or button), the driver 5 may be required to stop and wait for (X) seconds then try again. Vehicle may start if it is at a first level of disablement/inhibition/inconvenience. If not, the driver 5 may be required try again for (Y) number of tries, indicating a next level of disablement/inhibition/inconvenience. The numbers for (X) seconds and (Y) tries may be determined by the financing entity and programmed into the memory module 253 by wire or OTA. These numbers may be fixed or vary depending on number of overdue days. The override-command may be triggered/sent when the processor module 255 determines the overdue state and senses the required number of ignition key (button) activations with the required space between activations.

This signaling (i.e., the "codes" or "tiered steps") can be constructed by any set number of attempts that are done in a prescribed and unique time-based sequence with respect to number of attempts, duration of attempts, frequency of attempts, time between attempts, constant or variable time spacing between attempts, or any conceivable combination of these. For example, the "code" may be set as 5 attempts within 30 seconds, or 2 attempts within 30 seconds followed by a 1 minute "break" followed by 3 attempts within 45 seconds. The codes approving the override-command may be the same or different for all vehicles, and may be made as easy or as onerous as the programmer (e.g., financier) desires. According to one embodiment, signaling may be mixed between a plurality of signals. For example, the code may include first turning on the headlights, while the lights are on, step on the brakes twice within 15 seconds, press the alarm on the key fob, and attempt to start the ignition twice. It should be understood that this example is merely exemplary and that an infinite number of permutations are possible.

According to one embodiment, the system 100 may include or may be alternately configurable to an "inconvenience mode". In particular, at least one feature, aspect, or characteristic of the vehicle may be diminished rather than disabled in response to the at least one of the disable command, the enable-command, and the override-command. For example, similar to the "code" above the driver 5 may be required to perform a series of steps or operations (e.g. having to turn the start key several times) each time, in order to operate the vehicle 10. Accordingly, rather than being an obstacle to overcome to regain uninhibited access to or full functionality of the vehicle 10, the signaling becomes a persistent state or "inconvenience" attached to the operation of the vehicle until the unmet condition (e.g., timely payment) is met. Additional examples of "inconvenience" may include disabling radio, air conditioning, windshield wipers, etc. or may include intermittently "beeping" the vehicle horn or car alarm, thus creating a nuisance to the driver.

According to one embodiment, a method for inhibiting operation of a vehicle utilizing one or more components of the system 100 may include: commanding a vehicle inhibitor to inhibit operation of a vehicle; operating a system user interface in a predefined pattern such that an enable-command is communicated to a controller; receiving the enable-command and removing the inhibition of operation from the vehicle in response. The method may further include operating at least one of a vehicle equipment user interface or a user interface of a mobile device that is independent of the system user interface in a predefined pattern such that an override module communicates an override-command to the controller in response; and receiving the override-command and removing the inhibition of operation from the vehicle in response. The method may further include the system user interface alerting the driver to an impending disable command should a predefined condition (e.g. loan payment) not be made. As above the grouping of functions within a module, block, or step is for ease of description. Specific functions or steps can be moved from one module or block or distributed across to modules or blocks without departing from the disclosure. The above listed steps, steps derived from the above disclosure, and/or their equivalents may be embodied in processor-executable instructions that may reside on a non-transitory computer-readable or processor-readable storage medium.

Figure 4:
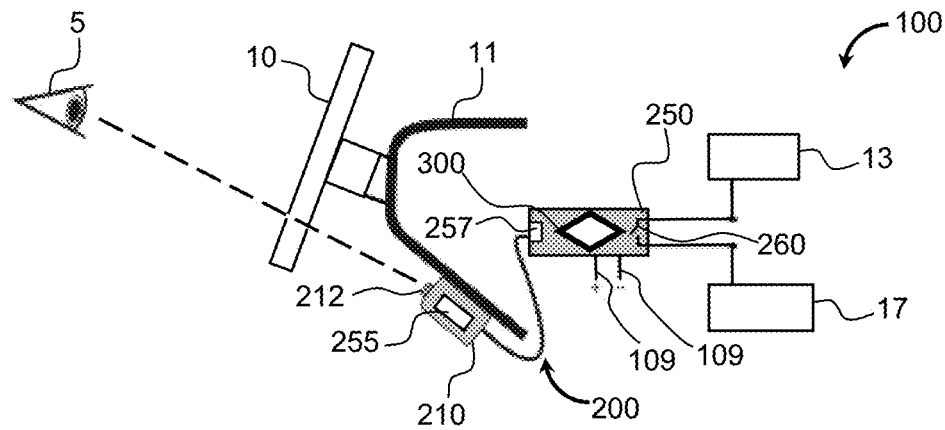
FIG. 4 schematically illustrates a system for inhibiting operation of a vehicle, according to one embodiment of the present disclosure.

FIG. 4 schematically illustrates a system for inhibiting operation of a vehicle, according to one embodiment of the present disclosure. As above, the system 100 may include the vehicle inhibitor 200 and the override module 300. Further, the vehicle inhibitor 200 may include the user interface 210 and the controller module 250. Also as above, the user interface 210 may be configured to issue communications to the driver 5. Also as above, the override module 300 may be integrated with the controller module 250 and powered by the vehicle 10 via the vehicle power interface 109 (here, shown as positive and negative leads to uninterrupted power lines of the vehicle 10).

According to the illustrated embodiment, both the user interface 210 and controller module 250 may be wired together as a single unit, and which may be easily mounted onto/into the vehicle 10, said vehicle 10 being subject to a payment/usage program, for example. Preferably, the user interface 210 may be located in view of the driver 5. Likewise, the controller module 250 will preferably be installed out of sight. In particular, the controller module 250 may be installed in a hidden location, such as behind a dashboard 11 or in an engine compartment of the vehicle 10. Alternately, the controller module 250 may be located in view of the driver 5.

According to one embodiment the user interface 210 may include at least one of a keypad, a visual indicator, and an audible indicator, which may be configured to alert or otherwise communicate with the driver 5 haptically, visually and/or audibly. For example, the driver 5 may be able to press buttons 212 of the keypad to enter payment and/or emergency codes, as discussed below. Also for example, the driver 5 may be visibly or audibly alerted of the "inhibited" status of the vehicle 10, or when a keypad input is accepted/not accepted.

As above, the vehicle inhibitor 200 is configured to inhibit operation of the vehicle 10 upon the occurrence of a pre-determined event. In particular, the vehicle inhibitor 200 may be operated in response to or otherwise triggered by various criteria. For example, the vehicle 10 may be inhibited when a payment is not timely made, and may resume uninhibited operation when the payment is made. According to one embodiment, the controller module 250 may include a clock or other time device, which may be embedded in or otherwise integrated with the controller module 250. For example, upon reaching predefined time and date, the controller module 250 may send the vehicle inhibitor 200 a disable command.

As above, the vehicle inhibitor 200 of the system 100 may be disengaged, or otherwise return the vehicle 10 to normal operation by the driver 5 via the user interface 210. In particular, the vehicle inhibitor 200 includes a mechanism whereby the driver 5 is able to communicate an enable-command (e.g., enter a code via the user interface 210) that disengages the vehicle inhibitor 200 or otherwise returns the vehicle 10 to normal (i.e., uninhibited) operation. For example, entry of a valid code via the keypad may serve as indication that a payment has been made and enables further use of the vehicle 10. The code may be provided to the driver 5 upon compliance with financial obligations for example.

Thus, on failure to timely make payments, the driver 5 may be prevented from using the vehicle 10 as the system 100 is arranged to disable the vehicle 10 by way of the critical system to which it is coupled.

Also as above, the override module 300, may be configured to override the vehicle inhibitor 200 of the vehicle independently of the user interface 210, for example using standard vehicle equipment. The override module 300 may merely operate as a backup of the user interface 210 (e.g., where the override-command has the same effect as the enable-command, where the override-command has the same effect as the enable-command for a predefined or otherwise limited time, etc.).

Alternately, the override-command may be a unique command that invokes a unique mode of inhibiting the vehicle 10. For example, according to one embodiment, the override-command may return the vehicle 10 to normal operation for a predefined period (e.g., 24 hours, until the motor is turned off, working hours, etc.) or with predefined limitations (e.g., limiting operating speed to non-freeway speeds, limiting operating area to a certain geographic area, placing periods of non-operation after shut down, requiring additional steps to operate the vehicle, etc.). Additional predefined periods may include "the greater of 1 hour or until shut off", 48 hours, etc.

According to one embodiment, the mode of inhibiting the vehicle 10 may be progressive, such that the predefined period or limitation is increased or is modified in nature/scope/intrusion. For example, each period of allowed vehicle operation may be decreased by 10%/25%/50% (e.g., 16 hours allowed operation, followed by 8 hours allowed operation, followed by 4 hours allowed operation, etc.). Also for example, each period of non-operation may be increased by one period (e.g., 1 day, 2 days, 3 days non-operation, etc.). Also for example, different limitation types may be aggregated (e.g., no radio, added to no heater/air conditioning, added to no highway speeds, etc.). According to one embodiment, enable-command from the user interface 210 may invoke one or more of the unique limitations described above. Beneficially, in this way the driver 5 may still be motivated to comply with any conditions of operation (e.g., make timely payments), without completely losing the ability to operate the vehicle 10. This may be particularly advantageous where there is a critical need to operate the vehicle 10 (e.g., an emergency situation), or may be advantageous in locations where complete disablement is not allowed or is only allowed under onerous requirements for the device owner/operator (e.g., a lender or lienholder).

FIG. 5 schematically illustrates a system for inhibiting operation of a vehicle, according to another embodiment of the present disclosure. As above, the system 100 may include the vehicle inhibitor 200 and the override module 300, and the vehicle inhibitor 200 may include the user interface 210, the controller module 250, and the electrical switch module 260.

As shown, the system 100 may further include anti-tamper features. In particular, the system 100 may hide/obscure the controller module 250 by having no traceable cable between the user interface 210 and the controller module 250 (particularly the electrical switch module 260.

According to one embodiment, the user interface 210 may be wirelessly coupled to the controller module 250. In particular, the user interface 210 may include a transmitter, and the controller module 250 may include a receiver. For example, the user interface 210 may include a transceiver 216 and the controller module 250 may include a wireless communications module 258, wherein the transceiver 216 and the wireless communications module 258 are communicably coupled, or otherwise configured to wirelessly communicate between each other information such as enable-commands, system status, operation condition status, communication feedback, and the like.

The transceiver 216 and the wireless communications module 258 may establish a wireless communication link over any convenient wireless protocol or media, such as Bluetooth, NFC, optical, inductive coupling, etc. The wireless communication link may full duplex, or in some embodiments, half duplex. In some embodiments the wireless communication link may include WWAN or WLAN technologies such as cellular or WiFi, preferably, the wireless communication link will include WPAN technologies such as Bluetooth LE and ZigBee, or even near field communications.

Figure 6:
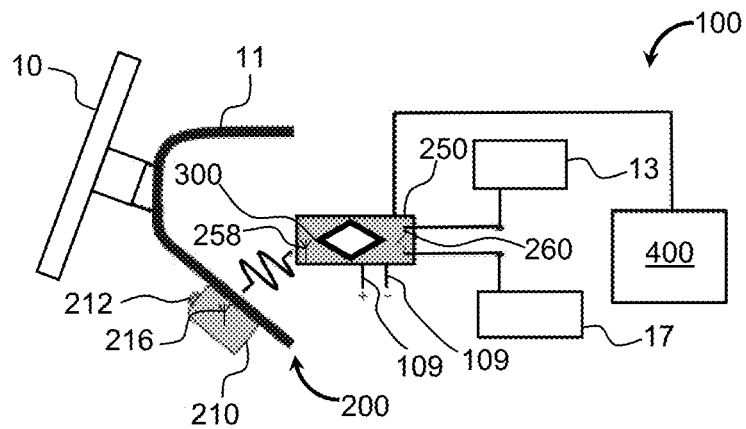
FIG. 6 schematically illustrates a system for inhibiting operation of a vehicle, according to yet another embodiment of the present disclosure.

FIG. 6 schematically illustrates a system for inhibiting operation of a vehicle, according to yet another embodiment of the present disclosure. As above, the system 100 may include the vehicle inhibitor 200 and the override module 300, and the vehicle inhibitor 200 may include the user interface 210, the controller module 250, and the electrical switch module 260. The system 100 may also include the above anti-tamper features.

As shown, the system 100 may further include location tracking features. In particular, the system 100 may further include a location module 400 communicably coupled to the controller module 250. The location module 400 may be configured to determine its own location, and thus the location of the system when coupled directly or proximately (e.g., wirelessly coupled to the controller module 250 via a short-range wireless communication link). The location module 400 may be further configured to provide the geolocation of the vehicle 10 to a remote third party, such as a lender or vehicle lienholder, for example. Preferably, the location module 400 will include a GPS (Global Positioning System) receiver, however other real time location devices/systems may be utilized independently or in combination.

According to one embodiment, the location module 400 may be a separate, or otherwise stand-alone device, or may be integrated in another device (e.g. a mobile phone, vehicle navigation system, etc.). Alternately, the location module 400 may be integrated with the vehicle inhibitor 200 (e.g., board mounted with a microprocessor of the controller module 250). Similarly, the location module 400 may be independently powered by an energy storage (e.g., lithium battery) or may be powered by onboard (vehicle) power, for example via the vehicle power interface 109. Beneficially, the location module 400 may be utilized in conjunction with the override module 300, as discussed below.

Figure 7:
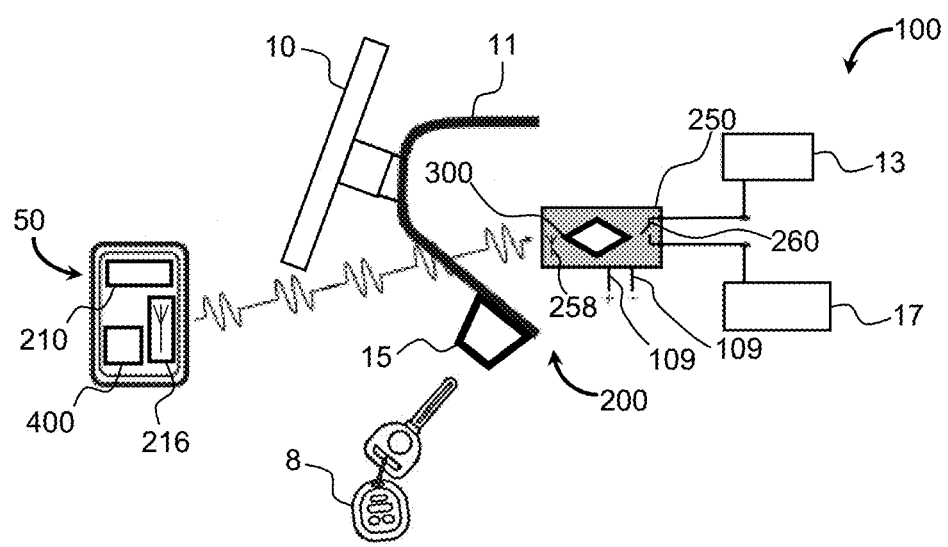
FIG. 7 schematically illustrates a system for inhibiting operation of a vehicle, according to yet another embodiment of the present disclosure.

FIG. 7 schematically illustrates a system for inhibiting operation of a vehicle, according to yet another embodiment of the present disclosure. In particular, here aspects of the system 100 are embodied in a mobile communication device 50. In particular, the user interface 210, or the functionality thereof, may be implemented in the mobile communication device 50. Alternately, the override module 300, or the functionality thereof, may be implemented in the mobile communication device 50, for example where the user interface 210 is present elsewhere as a separate device. Alternately, the location module 400, or the functionality thereof, may be implemented in the mobile communication device 50, for example via an application having access to location features (e.g., GPS radio) of the mobile communication device 50. Further, additional features and functionality of the system 100 may be implemented in or otherwise use aspects of the mobile communication device 50.

It should be understood the mobile communication device 50 is herein defined broadly as a module, and is not limited to a mobile phone or Smartphone, but is also applicable to various mobile terminal devices such as personal digital assistants (PDA), tablets, and electronic book terminals. Further, the mobile communication device 50 is not limited to multi-function device such as a smartphone with a special or dedicated mobile application installed, but may include a dedicated mobile user interface or a shared mobile interface, such as a hand held key fob 8 or other keyless entry device.

Functionally, this module (e.g., smartphone with dedicated application, mobile user interface, fob, etc.) may be programmed or otherwise configured to alert the driver to an impending disable command date (e.g., date the vehicle will be disabled or otherwise inhibited should the next loan payment not be made). This module may also be configured to transmit the enable-command (e.g., a reset signal provided by a financing entity) to the controller module 250 and/or the electrical switch module 260 to allow unhindered vehicle operation for another pay period.

Where the user interface 210 is present elsewhere as a separate device, this module may alternately be configured to send a special emergency override signal to remove the disable command, cooperating with and implementing the functionality of the override module 300 of the system 100. For example, the mobile communication device 50 may issue the override signal to remove the disable command for a preset amount of time to avoid stranding the driver when in the overdue state.

As above, the mobile communication device 50 may be wirelessly coupled to the controller module 250. In particular, mobile communication device 50 may include a transmitter (transceiver 216), and the controller module 250 may include a receiver (wireless communication module 258) or other hardware to communicably couple, or form a wireless communication link that may be full duplex, or in some embodiments, half duplex. Likewise, the wireless communication link may be over any convenient wireless protocol or media, such as Bluetooth, NFC, optical, inductive coupling, etc., and may rely on shared or otherwise preexisting hardware of the mobile communication device 50 (e.g., when embodied as a cell phone application). According to one embodiment, the wireless communication link may include a vehicle channel such a vehicle channel formed by Bluetooth pairing with the vehicle 10. According to another embodiment, the mobile communication device 50 may be configured to communicably couple with the controller module 250 via a wired connection such as a Micro USB cable (not shown).

According to one embodiment, wireless communication module 258 of the controller module 250 may include or otherwise incorporate a Bluetooth transceiver and microcontroller. The microcontroller may be programmable, and further may be programmed or otherwise configured to communicate with the user interface 210 (implemented in the mobile communication device 50), the override module 300 (i.e., to receive the override-command), or both.

However, where the user interface 210 is implemented in the mobile communication device 50, such as a Smartphone or other wireless module, and not permanently wired into the vehicle, there exists the possibility that it may become lost, stolen, broken, or not be available for many other reasons. Therefore, there may be times where the user interface 210 might not be available when needed to provide the enable-command. This could lead to dangerous and perhaps life-threatening situations. In this situation, the override module 300 sending the override-command may become critical.

Advantageously, and as discussed below, the override module 300 may be embodied in such a way to solve this problem with no added system cost, no added components, only software changes.

According to one embodiment, the controller module 250 may include an electrical switch module 260 electrically interspersed, communicably coupled, or otherwise configured so as to interrupt power to the starter control circuit of the vehicle 10 (e.g., in series between a vehicle starter switch 13 and a vehicle starter control circuit 17, in series with a starter, etc.) in response to a command from the controller module 250, for example.

According to one embodiment, the electrical switch module 260 may be configured to interrupt the flow of power to the vehicle ignition/starter upon receiving a command to do so (e.g., a "disable command") from the controller module 250, for example via software executing in a microcontroller or other processing unit.

According to one embodiment, the controller module 250 may be further configured to receive and utilize location features of the mobile communication device 50 (e.g., repurposing or otherwise accessing the smartphone's GPS tracking ability) as the location module 400, particularly where a close range wireless technology is utilized between the mobile communication device 50 and the controller module 250. Advantageously, this embodiment may provide the similar features or functionality shown in FIG. 6, but at a much lower cost, due to the elimination of the separate GPS system and the User Interface keypad (see ref. FIG. 6, having a dedicated location module 400 and user interface 210, respectively).

For example, a separate GPS system (as disclosed above) might be added to a loan payment enforcement system (system 100) to expedite locating the vehicle 10 when the vehicle's loan is in default. While this is a highly desirable feature, it may add a great deal of cost. However, as by utilizing the location features of the mobile communication device 50, savings and additional functionality may be achieved. In particular, a GPS system is present in many types of the mobile communication device 50, particularly Smartphones.

It should be noted that indiscriminate GPS tracking of his vehicle can be offensive to the debtor. Standard "breadcrumb tracking" is a common policy with stand-alone vehicle GPS systems on the market today. Therefore according to one embodiment of this disclosure, the location module 400 may be disabled from determining the geolocation of the vehicle 10 until enabled by the controller module 250, the controller module 250 further configured to only enable the location module upon the occurrence of the predetermined event. For example, with the dedicated location module 400 of FIG. 6, the location module 400 may be normally powered off, selectably communicably coupled to the controller module 250, or otherwise be disabled until the occurrence of the predetermined event (e.g., missed payment). Likewise, here, the use of the location features of the mobile communication device 50 (the smartphone GPS capability) may be limited (e.g., by a mobile application running on the mobile communication device 50, or by the controller module 250, such as in firmware). Beneficially, this limitation may provide a "guarantee" to the user/driver that fixed limitations to making a location determination of the vehicle can only occur upon the triggering event (i.e., loan default), when debtor is in a grace period, or when a debtor is out of the grace period, but not before.

According to an alternate embodiment, the mobile communication device 50 or a mobile application installed thereon, may include an output to disable or enable the vehicle from a remote location (e.g., the financier's location) through a cellular connection that is included with the GPS unit. Beneficially, this can make it possible for the driver 5 to request from the finance company that an emergency override-command or enable-command to be sent over the air (e.g., via a cell phone or WiFi network) to the driver 5 in default. Furthermore, this may be a highly desirable feature in emergencies. As above, this feature, of being able to wirelessly override/enable the disabled vehicle state of the system 100, would not be available if the user interface 210 (implemented in a cellphone or dedicated decoupled unit) is lost or inoperable. Again, with the override module 300, the driver 5 may directly override the disable command when required, without the need of the user interface 210, without the need of a cellular connection, and without the need for any additional components or any additional wiring, or going into the vehicle's CAN bus.

Figure 8:
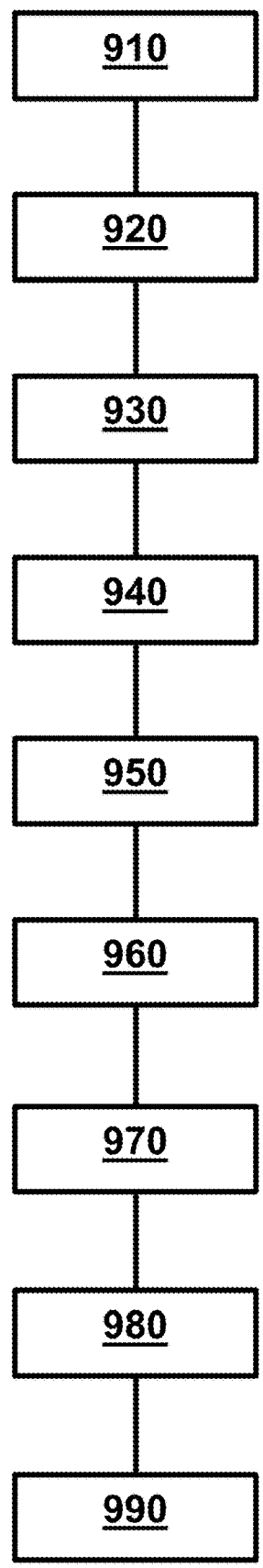
FIG. 8 is a flow diagram illustrating a method for inhibiting operation of a vehicle, according to an embodiment of the present disclosure.

FIG. 8 is a flow diagram illustrating a method for inhibiting operation of a vehicle, according to an embodiment of the present disclosure. In particular, the method for inhibiting operation of a vehicle may include one or more components or features of the system 100 as described above. As illustrated, the method may include the steps of: step one 901, providing the a vehicle inhibitor to inhibit operation of a vehicle (system 100 as discussed above); step two 902, installing the vehicle inhibitor; step three 903, operating the system's user interface in a predefined pattern such that an enable-command is communicated to the controller; step four 904, receiving the enable-command; and step five 905, removing the inhibition of operation from the vehicle in response. According to one embodiment, the method may further include the steps of: step six 906, operating at least one of a vehicle equipment user interface or a user interface of a mobile device that is independent of the system user interface in a predefined pattern such that an override module communicates an override-command to the controller in response; step seven 970, receiving the override-command; and step eight 980, removing the inhibition of operation from the vehicle in response. According to one embodiment, the method may further include the step of: step nine 990, alerting the driver to an impending disable command should a predefined condition (e.g. loan payment) not be made. It is understood that one or more of the above listed steps may be performed in an order differently than presented, repeated, and/or skipped.

As above, the vehicle inhibitor 200 may include a user interface 210 embodied as a module visible to the driver. In addition, the user interface 210 may be installed anywhere inside the vehicle 10 and/or may be functionally implemented in the mobile communication device 50 (e.g., as a phone app). Also as above, the user interface 210 may include a user-input or otherwise be configured to receive communications from the driver 5, and/or may include a user-output or otherwise be configured to issue communications to the driver 5. More particularly, the user interface 210 may include at least one of a keypad, a visual indicator, and an audible indicator, which may be configured to alert or otherwise communicate with the driver 5 haptically, visually, and/or audibly (e.g., an alert of the "inhibited" status of the vehicle 10). Also as above, the user interface 210 may be wired or wirelessly coupled to the vehicle inhibitor 200.

Figure 9:
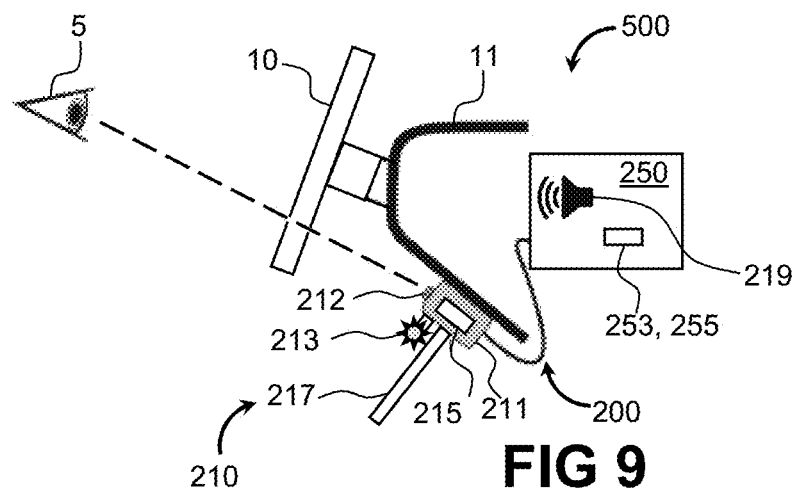
FIG. 9 schematically illustrates a system for inhibiting operation of a vehicle, empathizing the output of the user interface, according to one embodiment of the present disclosure.

FIG. 9 schematically illustrates a system for inhibiting operation of a vehicle, empathizing the output of the user interface, according to one embodiment of the present disclosure. Here, a system 500 may be configured similar to the system 100 of FIG. 4 including the vehicle inhibitor 200, and may also include the override module 300 (not shown). Likewise, the vehicle inhibitor 200 may include the user interface 210 and the controller module 250.

Also as above, the user interface 210 may be configured to issue communications (broadly defined) to the driver 5. In particular, and as shown here, the user interface 210 may include at least one of keypad buttons 212, a status indicator 213, a display 217, and a speaker 219. The status indicator 213 may be embodied as a simple light, a series of lights or variable LED(s), and/or a haptic indicator such as a vibration motor, to name a few. The display 217 may be embodied as a conventional visual display such as a monochrome display, a color display, and/or a touchpad, to name a few. The speaker 219 may be embodied as a buzzer, a bell, and/or audio speaker, to name a few.

According to one embodiment, user interface 210 of the system 500 may be configured to communicate varying degrees of information to the user 5 via the user-output of the user interface 210. Generally, the user-output may be configured as a simple indicator (i.e., outputting one or more binary communications), a full-service user output (e.g., outputting rich data/media such as text, images, speech, video, and/or interactive/dynamic data, as well as outputting in multiple media), or any combination thereof.

To illustrate a few examples of outputted data/information/communications), the user interface 210 of the system 500 may be configured to communicate information such as Payment Due Date, Payment Reminder (3 days, 2, days, 1 day), a Device Status (vehicle starter locked out/not locked out), a Virtual keypad (in/out), on or more Virtual buttons, information that a recently made override is only valid/active for a fixed period, an indication of a Grace Period (e.g., number of days vehicle with be without the inhibited functionality.

One skilled in the art will recognize multiple ways to configure the user interface 210 as described above. Generally, user-output of the user interface 210 may incorporate appropriate output hardware with processing and data.

For example, where the user-output of the user interface 210 is desired to be configured as a simple indicator to communicate a simple binary state such as the vehicle's starter being locked out/not locked out, merely including the status indicator 213 may be appropriate (e.g., red LED for locked out and green not locked out status), along with electronics configured to light each color corresponding to the state of the system 500. Similarly, a buzzer or speaker 219 may be arranged to issue an audible sound to the same effect (independently or in combination with the status indicator 213).

Also for example, where the user-output of the user interface 210 is desired to be configured as a full-service user output to digitally communicate rich data/media such as video instructions how to override a lockout/how to connect another device as the U/I, text showing the number of days left before a lockout will occur/phone number where a missed payment can be paid, interactive audio asking what intervals reminders should be set/menu of audio instructions, images such as a virtual keypad or a geomap of a limited area where inhibited vehicle may be driven (to name a few), including the display 217, and/or any combination of the speaker 219 and the status indicator 213 may be appropriate, along with any appropriate electronics/programming. According to one embodiment, the speaker 219 may include a microphone.

Configuring the user interface 210 as a full-service user output may be particularly beneficial for communicating dynamic or otherwise variable information to the driver. For example, where the driver changes residency to a state without a grace period to a state that requires a grace period, the full-service user output can provide this changed information, whereas a simple indicator might not. Also, a single device may be reconfigured from a first application/use to a second application/use using the same user interface 210.

According to another embodiment, the user interface 210 may include a local processor/memory 215 configured to operate any user-input and/or user-output hardware (e.g., video card, audio ASIC, etc.). According to yet another embodiment, local processor/memory 215 may be programmed to execute code stored on the memory module 253 and that utilized data stored on the memory module 253, and/or may complement or even replace one or both of the memory module 253 and the processor module 255.

According to one embodiment, the user interface 210 may be a dedicated unit of the system 500. Further, one or more components of the user interface 210 may be distributed across the system 500. For example, as shown, the status indicator 213 and the display 217 may be integrated into a user interface housing 211, while the speaker 219 may be housed elsewhere in the controller module 250. Also as shown, components of the user interface housing 211 may be communicably coupled to the controller module 250 (e.g., via wire, wirelessly, or a combination thereof).

Figure 10:
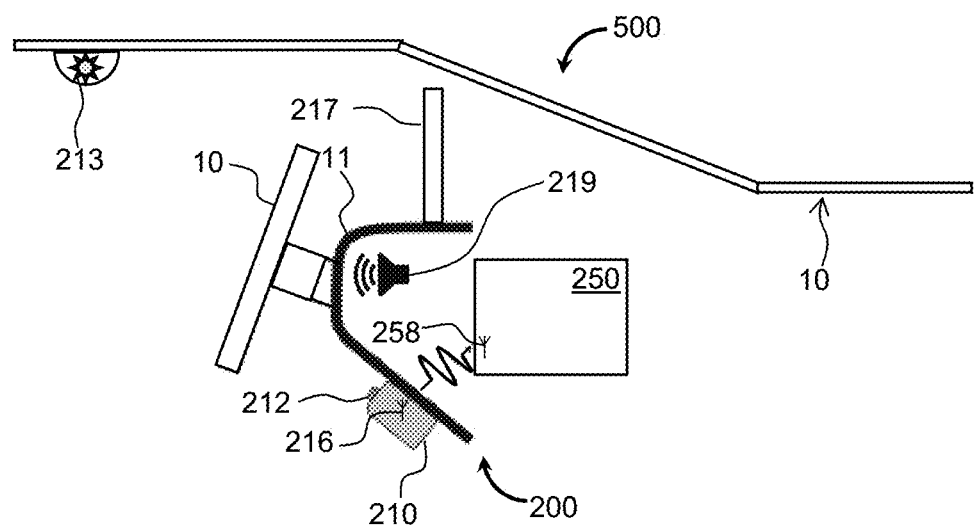
FIG. 10 schematically illustrates a system for inhibiting operation of a vehicle, empathizing the output of the user interface, according to another embodiment of the present disclosure.

FIG. 10 schematically illustrates a system for inhibiting operation of a vehicle, empathizing the output of the user interface, according to another embodiment of the present disclosure. As shown, at least one component of the user interface 210 may be repurposed from or otherwise integrated with the vehicle 10.

For example, as shown, the status indicator 213 may be strategically integrated into the vehicle 10 as a repurposed interior light of the vehicle. In particular, the interior light of the vehicle 10 may be controlled by the system 500 (e.g., via the controller module 250) in a predetermined manner as the status indicator 213 that is inconsistent with its normal operation (e.g., flashing the dome light during attempts to operate a locked out vehicle, lighting a dash light when a correct override-command is communicated to the controller, etc.).

Also for example, as shown, the display 217 may be strategically integrated into the vehicle 10 as a repurposed display of the vehicle. In particular, a dash display or a heads-up display (or the like) of the vehicle 10 may be controlled by the system 500 (e.g., via the controller module 250) in a predetermined manner as the display 217 of the system 500. This may be achieved by merely pushing information from the system 500 to the display of the vehicle or by pulling information from the system 500 and incorporating it into the vehicle's display protocol. As discussed below, comprehensive information may be communicated to the user in this embodiment.

Also for example, as shown, the speaker 219 may be strategically integrated into the vehicle 10 as a repurposed audio device of the vehicle. In particular, a horn, a stereo speaker, a microphone, an audio alert (or the like) of the vehicle 10 may be controlled by the system 500 (e.g., via the controller module 250) in a predetermined manner as the speaker 219 that is inconsistent with its normal operation (e.g., sounding the vehicle horn in brief clips during attempts to operate a locked out vehicle, articulating verbal instructions on how to send an override-command after a predefined number of start attempts without an enable-command, etc.).

Each of the status indicator 213, the display 217 and the speaker 219 may be configured to communicate information to the driver commensurate with its media. For example, the status indicator 213 may be configured to indicate simple information such as at least one status of the system 500 (e.g., locked out, lock out eminent, grace period, override, etc.). The display 217 may be configured to communicate the same information of the status indicator 213, as well as more detailed information such as written information, visual imagery, video, and even video information (e.g., override instructions). The speaker 219 may be configured to indicate simple information such as the status indicator 213, and may be further configured to give spoken information similar in scope to the display 217.

According to one embodiment, at least two of: the keypad buttons 212, the status indicator 213, the display 217, and the speaker 219 may be coordinated to provide richer, more interactive information. For example, a red light of the status indicator 213 may indicate a "lock out status" of the vehicle, touching any keypad button 212 one time may then initiate the display 217 to communicate the current "lock out" status of the vehicle followed by an instruction over the speaker 219 that if the user/driver 5 wishes to initiate an override sequence, the user 5 must operate certain vehicle controls in a predetermined pattern.

Figure 11:
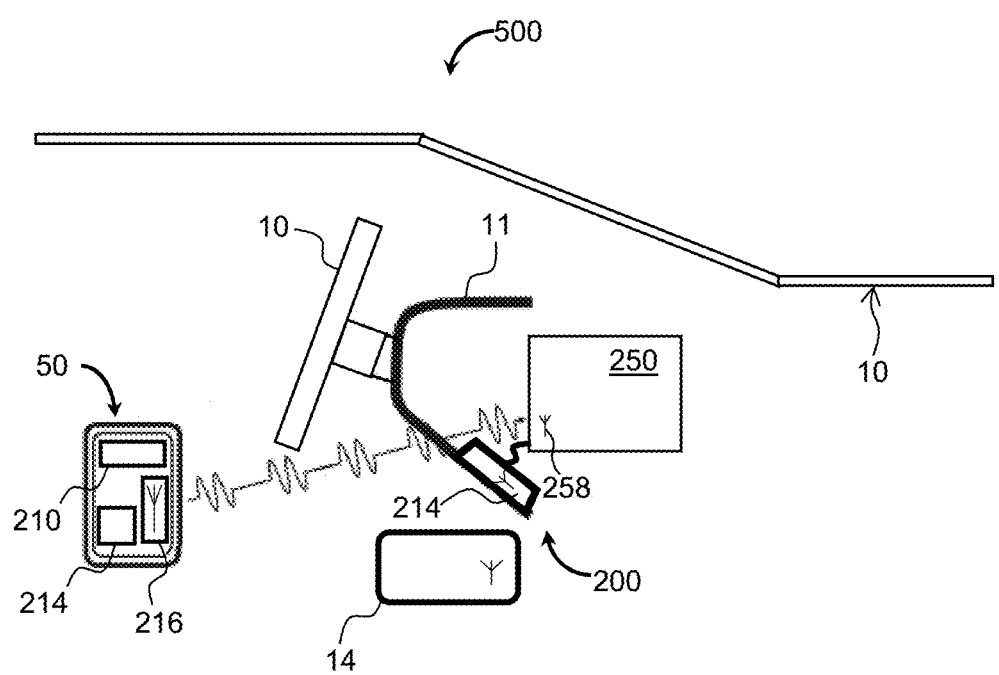
FIG. 11 schematically illustrates a system for inhibiting operation of a vehicle, empathizing the output of the user interface, according to yet another embodiment of the present disclosure.

FIG. 11 schematically illustrates a system for inhibiting operation of a vehicle, empathizing the output of the user interface, according to yet another embodiment of the present disclosure. As shown, and as above, the user interface 210, or the functionality thereof, may be implemented in the mobile communication device 50. In particular, the mobile communication device 50 may include at least one of: the keypad buttons 212, the status indicator 213, the display 217, and the speaker 219. For example, and as shown, each (i.e., the keypad buttons 212, the status indicator 213, the display 217, and the speaker 219) may be implemented in the mobile communication device 50.

According to one embodiment, some or all of the functionality of the user interface 210 may be downloaded to the mobile communication device 50, for example, as a mobile application. As shown, the user interface 210 on the mobile communication device 50 may be the sole user interface 210 of the system 500. Further, when the user interface 210 is embodied as part of the mobile communication device 50, the user interface 210 may be configured for the full-service user output described above, and/or any other output/data native to the mobile communication device 50.

Alternately, the user interface 210 residing on the mobile communication device 50 (or any functionality thereof) may be configured as an additional or redundant user interface 210 of the of the system 500. For example, one or more of: the keypad buttons 212, the status indicator 213, the display 217, and the speaker 219 may be implemented on the mobile communication device 50 whereas others (or the same) may reside elsewhere. In particular, they may be dedicated components of the system 500 as illustrated in FIG. 9 and/or repurposed from or otherwise integrated with the vehicle 10 as illustrated in FIG. 10.

According to one embodiment, the system 500 may be configured to connect to a home network. In particular, at least one of the user interface 210 and the controller module 250 may include a home network radio (e.g., WiFi, Bluetooth, etc.) appropriate for communications with a home network. For example, home network radio may be resident in at least one of transceiver 216 of the mobile communication device 50 and the wireless communication module 258. Benefits of connecting to a home network include the ability to operate/interact with the system 500 while outside of the vehicle and/or with richer interaction and full-service user output when the user interface 210 is a simple indicator or otherwise less that a full-service user output, or unavailable.

According to one embodiment, the user interface 210 may include an NFC port 214. In particular, the user interface 210 may be configured for nearfield communications with a token such as an RFID tag 14. The NFC port 214 may be a repurposed or otherwise accessed port of the mobile communication device 50. Alternately, or in addition, the NFC port 214 may be dedicated and part of a user interface 210 fixed to the vehicle. In operation, a driver may take an "emergency release" tag, for example, out of the vehicle glove box, pass it before the NFC port 214 and be granted limited or complete access to the vehicle. This may be particularly beneficial where a vehicle it being repossessed by its lawful owned or agent.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The foregoing method descriptions and steps are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods.

The above description of the various embodiments is provided to enable a person of ordinary skill in the art to make or use the subject matter of the disclosure. Various modifications to the embodiments will be readily apparent to those skilled in the art, and the generic principles defined herein may be applied to other variations without departing from the spirit or the scope of this disclosure. Thus, it is to be understood that the disclosure is not intended to be limited to the examples and designs described herein, which merely represent a presently preferred implementation of the disclosure, but that the disclosure is to be accorded the widest scope consistent with the principles and novel features disclosed herein. It is to be further understood that the scope of the present disclosure fully encompasses other embodiments that may become obvious to those skilled in the art.

The invention claimed is:

1. A vehicle inhibitor for a vehicle, the vehicle including a vehicle battery, the vehicle inhibitor comprising:
a power supply configured to power the vehicle inhibitor;
a controller module configured to inhibit normal operation of the vehicle by a driver upon the occurrence of a predetermined event, and further configured to resume the inhibited normal operation of the vehicle by the driver upon receiving an enable-command;

a user interface communicably coupled to the controller module, the user interface including a user-input and a user-output,
the user-input configured receive an enable communication from the driver and to transmit the enable-command to the controller module in response to the enable communication received from the driver, and
the user-output configured to visually or aurally indicate a status of the vehicle inhibitor to the driver;
a vehicle signaling interface configured to communicably couple to the vehicle and to receive an override communication sent by the driver to the vehicle signaling interface via the vehicle; and
an override module communicably coupled to the vehicle signaling interface and the controller module, the override module configured to issue an override-command in response to the override communication sent by the driver to the vehicle signaling interface; and
wherein the controller module is further configured to resume the inhibited normal operation of the vehicle by the driver upon receiving the override-command;
wherein the power supply includes a vehicle power interface configured to electrically couple to the vehicle battery, and to power the vehicle inhibitor from the vehicle battery; and
wherein the user-output is further configured to indicate the status of the vehicle inhibitor to the driver prior to the occurrence of the predetermined event.

2. The vehicle inhibitor of claim 1, wherein the user-output includes at least one of a buzzer, a bell, and audio speaker.

3. The vehicle inhibitor of claim 1, wherein the user-output includes at least one of an indicator light, a monochrome display, a color display, and, a touchpad.

4. The vehicle inhibitor of claim 1, wherein the user interface includes a user interface housing affixable to the vehicle; and
wherein at least a portion of the user-input and alternately the user-output are supported by the user interface housing.

5. The vehicle inhibitor of claim 4, wherein at least a portion of the user interface is configured to communicably couple with the controller module wirelessly.

6. The vehicle inhibitor of claim 1, wherein at least a portion of the user interface is implemented in a mobile communication device, and the vehicle inhibitor user interface is configured to communicably couple with the controller module wirelessly.

7. The vehicle inhibitor of claim 1, wherein at least a portion of the user-output is part of the vehicle, operable in both vehicle functionality and vehicle inhibitor functionality.

8. The vehicle inhibitor of claim 1, wherein the user-output of the user interface is further configured to digitally display text that indicates to a driver when the inhibited normal operation of the vehicle begins and when the inhibited normal operation of the vehicle ends.

9. The vehicle inhibitor of claim 1, wherein the user-input of the user interface is further configured for nearfield communications with a token, such that interaction with said token will resume the inhibited normal operation of the vehicle.

10. A vehicle inhibitor for a vehicle, the vehicle including a vehicle battery, the vehicle inhibitor comprising:
a power supply configured to power the vehicle inhibitor the power supply includes a vehicle power interface configured to electrically couple to the vehicle battery, and to power the vehicle inhibitor from the vehicle battery;
a controller module configured to inhibit normal operation of the vehicle by a driver upon the occurrence of a predetermined event, and further configured to resume the inhibited normal operation of the vehicle by the driver upon receiving at least one of an enable-command or an override-command;
a vehicle signaling interface configured to communicably couple to the vehicle and to receive an override communication sent by the driver to the vehicle signaling interface via the vehicle;
an override module communicably coupled to the vehicle signaling interface and the controller module, the override module configured to issue an override-command in response to the override communication received by the driver to the vehicle signaling interface; and
a user interface communicably coupled to the controller module, the user interface including a user-input and a user-output,
the user-input configured to receive an enable communication from the driver and to transmit the enable-command to the controller module in response to the enable communication received from the driver,
the user-output configured to visually or aurally indicate a status of the vehicle inhibitor to the driver.

11. The vehicle inhibitor of claim 10, further comprising a location module communicably coupled to the controller module, and configured to provide a geolocation of the vehicle to a remote third party.

12. The vehicle inhibitor of claim 10, wherein the status includes a first binary indication that the vehicle is inhibited or is not inhibited; and
wherein the user-output of the user interface is further configured to indicate the first binary indication to the driver.

13. The vehicle inhibitor of claim 12, wherein the status includes a second binary indication that the vehicle will be inhibited within a predetermined time before the occurrence of the predetermined event; and
wherein the user-output of the user interface is further configured to indicate the second binary indication to the driver at the predetermined time before the occurrence of the predetermined event.

14. The vehicle inhibitor of claim 10, wherein the user-output of the user interface is further configured to digitally display at least one of text and images to the driver.

15. The vehicle inhibitor of claim 10, wherein the controller module includes a home network radio configured to communicably couple with a home network and to communicate wirelessly with the home network.

16. The vehicle inhibitor of claim 10, wherein the user-input of the user interface is further configured for nearfield communications with a token, such that interaction with said token will resume the inhibited normal operation of the vehicle.

17. A vehicle inhibitor for a vehicle, the vehicle including a vehicle battery, the vehicle inhibitor comprising:
a power supply configured to power the vehicle inhibitor the power supply includes a vehicle power interface configured to electrically couple to the vehicle battery, and to power the vehicle inhibitor from the vehicle battery;
a controller module configured to inhibit a normal operation of the vehicle upon the occurrence of a predetermined event, and further configured to resume the inhibited normal operation of the vehicle upon receiving at least one of an enable-command or an override-command;

a vehicle signaling interface configured to communicably couple to the vehicle and to receive an override communication sent by a driver to the vehicle signaling interface via the vehicle;

an override module communicably coupled to the vehicle signaling interface and the controller module, the override module configured to issue an override-command in response to the override communication received by the driver to the vehicle signaling interface; and a user interface communicably coupled to the controller module, the user interface including a means for aurally or visually communicating a status of the vehicle inhibitor to the driver, the status having at least a first and a second portion, the first portion of the status of the vehicle inhibitor being whether or not the normal operation of the vehicle is inhibited, and the second portion of the status of the vehicle inhibitor being a duration of the resumption of the inhibited normal operation of the vehicle where the override-command has been received by the override module.

18. The vehicle inhibitor of claim 17, wherein the status of the vehicle inhibitor has a third portion warning an amount of time left before occurrence of the predetermined event.

19. The vehicle inhibitor of claim 17, wherein the means for aurally or visually communicating the status of the vehicle inhibitor to the driver is further configured to aurally or visually instruct the driver predefined actions that will resume the inhibited normal operation of the vehicle.

\* \* \* \* \*